(12) United States Patent
Lo et al.

(10) Patent No.: US 7,599,016 B2
(45) Date of Patent: Oct. 6, 2009

(54) FLAT PANEL DISPLAY MODULE

(75) Inventors: Chi-Chung Lo, Chang Hua Hsien (TW); Chia-Jung Wu, Chia Yi Hsien (TW)

(73) Assignee: AU Optronics Corp., Hsinchu (TW)

( * ) Notice: Subject to any disclaimer, the term of this patent is extended or adjusted under 35 U.S.C. 154(b) by 437 days.

(21) Appl. No.: 11/490,093

(22) Filed: Jul. 21, 2006

(65) Prior Publication Data
US 2007/0064378 A1   Mar. 22, 2007

(30) Foreign Application Priority Data
Sep. 16, 2005   (TW) ............... 94132145 A

(51) Int. Cl.
*G02F 1/1333*   (2006.01)
(52) U.S. Cl. ............... 349/56; 349/58; 349/60
(58) Field of Classification Search ........... 349/56
See application file for complete search history.

(56) References Cited

U.S. PATENT DOCUMENTS

| | | | |
|---|---|---|---|
| 6,067,133 A * | 5/2000 | Niibori et al. ............... 349/60 |
| 6,199,987 B1 * | 3/2001 | Haba et al. ............... 353/34 |
| 6,587,167 B1 * | 7/2003 | Fujimori et al. ............... 349/58 |
| 6,919,938 B2 * | 7/2005 | Choi et al. ............... 349/58 |
| 2001/0002145 A1 * | 5/2001 | Lee et al. ............... 349/58 |
| 2002/0015118 A1 * | 2/2002 | Kashimoto ............... 349/58 |
| 2002/0171784 A1 * | 11/2002 | Choi et al. ............... 349/58 |

FOREIGN PATENT DOCUMENTS

| CN | 1450388 A | 10/2003 |
|---|---|---|
| CN | 1621904 A | 6/2005 |
| JP | 2003-84263 A | 3/2003 |
| JP | 2004-233812 A | 8/2004 |
| JP | 2005-189597 A | 7/2005 |

* cited by examiner

*Primary Examiner*—Frank G Font
*Assistant Examiner*—Mary A El Shammaa
(74) *Attorney, Agent, or Firm*—Birch, Stewart, Kolasch & Birch, LLP

(57) ABSTRACT

A flat panel display module comprises a display panel clamped by a first frame and a second frame structure. The first frame includes a sidewall and an elastic piece, wherein the sidewall encloses the display panel and has a breach. The elastic piece is disposed in the breach of the sidewall. The second frame can be assembled on the first frame. The second frame presses the elastic piece so that the elastic piece is curved to contact a side of the display panel.

20 Claims, 6 Drawing Sheets

FLAT PANEL DISPLAY MODULE

This application claims the benefit of Taiwan Patent Application Serial No. 094132145, filed Sep. 16, 2005, the subject matter of which is incorporated herein by reference.

BACKGROUND OF THE INVENTION (1) Field of the Invention

The present invention relates to a flat panel display module, and more specifically to a flat panel display module including a display panel and a frame that is capable of tightly clamping the display panel.

(2) Description of the Prior Art

The LCD technology is widely used in display monitors, mobile phones, digital cameras, digital video cams, personal digital assistances (PDA), and many other electronic devices. Thus, for the display operation, a LCD panel plays an important role. A backlight unit is usually required to illuminate the LCD panel since the LCD panel is a non-self-luminous device. A conventional LCM (liquid crystal module) includes a front frame part, a plastic frame body and a rear frame part, which cooperatively confine the LCD panel and the backlight unit thereamong. Therefore, great care should be taken during designing the frame in order to provide the structure strength and convenience for assembly of the components.

During the assembly, the tightness or friction between the front frame part and the LCD panel, the backlight unit and the rear frame part, and the front and rear frame parts is taken into account so as to provide the most ideal structure. In order to provide the optimum tightness, the plastic frame body is disposed between the front and rear frame parts in order to clamp the LCD panel.

FIG. 1A is a traditional top view illustrating how a plastic frame body 20 clamps an LCD panel 10 therein. The plastic frame body 20 has a plurality of retention ribs 21 projecting from an inner surface of the plastic frame body 20 to clamp the LCD panel 10. The plastic frame body 20 further has an opening for permitting light beams emitted from a backlight unit (not shown) to pass through. FIG. 1B is a sectional view along the line A-A in FIG. 1A. As illustrated in FIG. 1B, the plastic frame body 20 has a sidewall 22 enclosing the peripheral portion of the LCD panel 10 and a flat-base portion 23 supporting the LCD panel 10. The retention ribs 21 project from the adjoining areas between the sidewall 22 and the flat-base portion 23 to abut tightly against the side of the LCD panel 10. The sidewall 22 has an outward protrusion 24 that abuts against the front frame part 30 once the front frame part 30 is sleeved on the plastic frame body 20 such that a portion of the front frame part 30 opposite to the flat-base portion 23 confine the LCD panel 10 therebetween.

In the prior art, securing of the LCD panel 10 between the front frame part 30 and the plastic frame body 20 depends solely on the retention ribs 21. Therefore, it requires high precision technology to form the retention ribs 21 that are spaced from one another at the ideal distance to clamp the LCD panel 10 thereamong. However, it is relatively difficult to provide high precision distance between the adjacent two retention ribs 21. Moreover, some tiny particles may be produced when mounting the LCD panel 10 into the plastic frame body 20 because the retention ribs 21 scrape and collide against the side of the LCD panel 10. The tiny particles may fall into and cover the backlight unit. In addition, the retention ribs 21 are susceptible to break and eventually lead to clearance between the LCD panel 10 and the plastic frame body 20. Under this condition, the LCD panel 10 may wobble within the plastic frame body 20.

SUMMARY OF THE INVENTION

One object of the present invention is to provide a flat panel display module including a plurality of the elastic pieces that is disposed at the side of a plastic frame to clamp the display panel to prevent its wobbling in the gap between the display panel and the plastic frame, or between the plastic frame and a front frame.

The flat panel display module comprises a display panel clamped by a first frame and a second frame. The first frame includes a sidewall and an elastic piece, wherein the sidewall encloses the display panel and has a breach. The elastic piece is disposed in the breach of the sidewall. The second frame can be assembled on the first frame. The second frame presses the elastic piece so that the elastic piece is curved to contact a side of the display panel.

The display panel may be a liquid crystal display panel or an organic electroluminescent display panel. Several preferred embodiments illustrate how to increase the stability for the combination of the display panel and the frames. The elastic piece of the first frame has a protrusion projecting outward. Once the second frame presses the protrusion, the elastic piece is curved to contact the side of the display panel. In addition, the inner side of the elastic piece may have another protrusion to clamp the display panel more tightly.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1A:
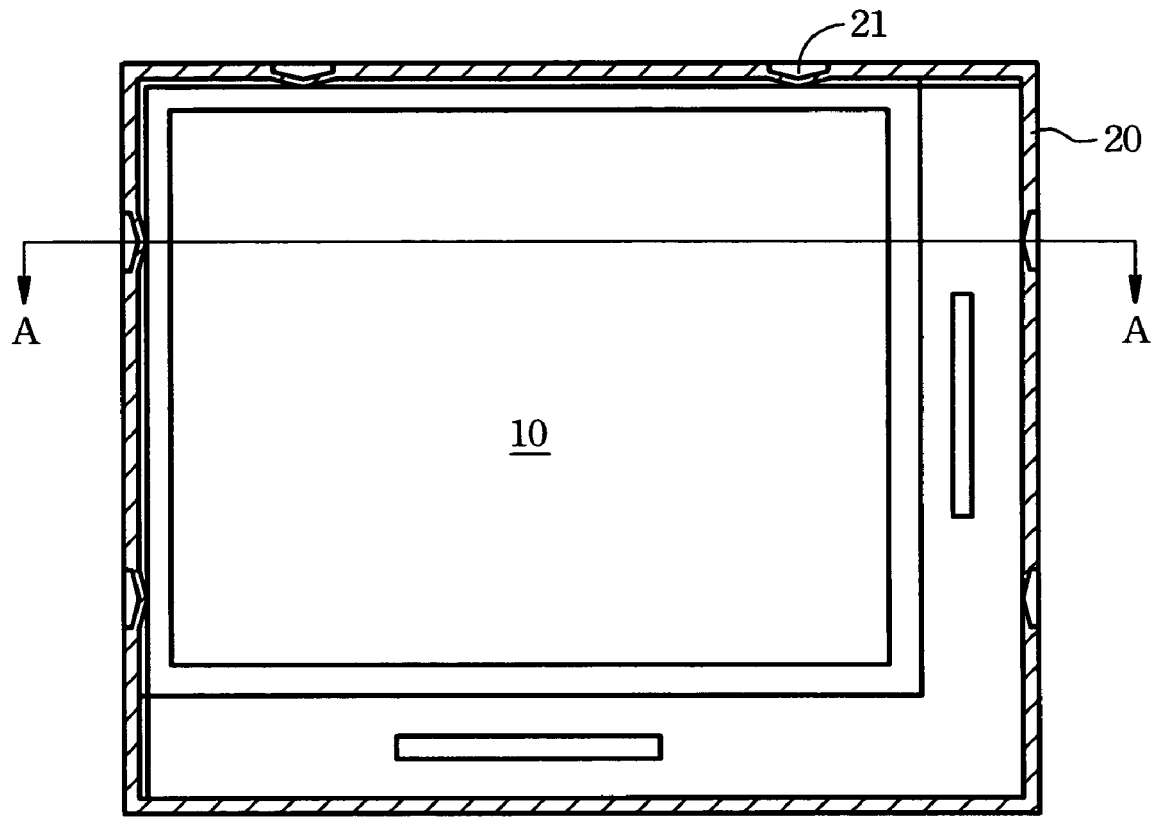
FIG. 1A is a top view illustrating how the plastic frame body clamps the LCD panel according to the prior art.
Figure 1B:
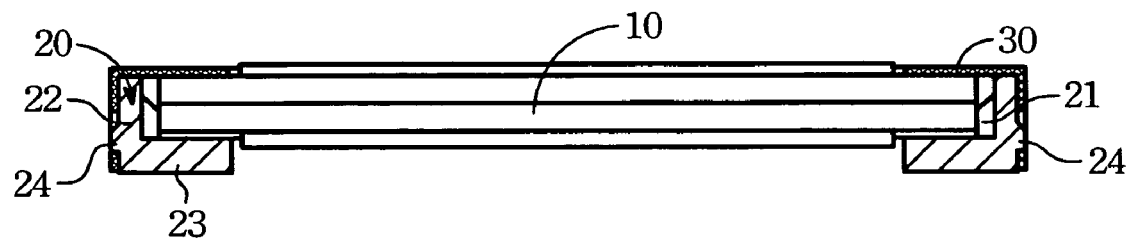
FIG. 1B is a sectional view along the line A-A in FIG. 1A.
Figure 2A:
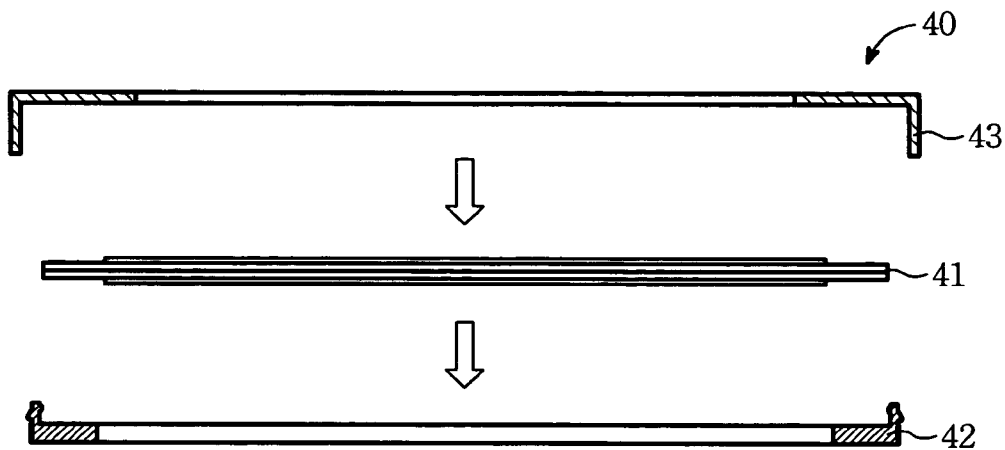
FIG. 2A is an exploded view of a flat panel display module according to an embodiment of the present invention.

FIG. 2A shows a flat panel display module 40, includes a display panel 41, a first frame 42 and a second frame 43. The display panel 41 is clamped through the second frame 43 assembled on the first frame 42. As shown in arrows, the display panel 41 is put into the first frame 42, and then is covered by the second frame 43. The second frame 43 is assembled on the first frame 42 to fix the display panel 41 to construct the flat panel display module 40.

Figure 2B:
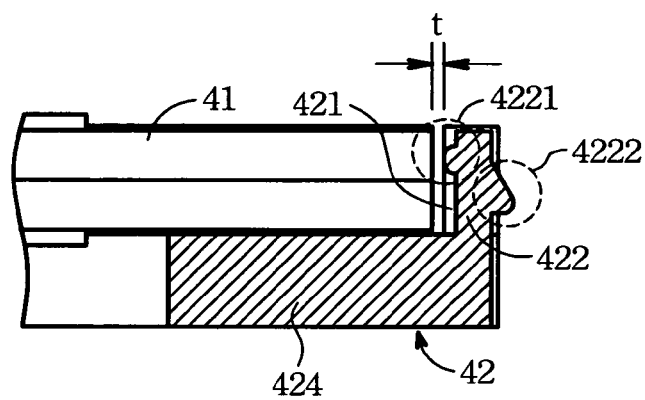
FIG. 2B is an enlarged view of the portion between the display panel and the first frame.

Referring to FIG. 2B, the first frame 42, of which the side-looking is shaped roughly "L", includes an elastic piece 422 and a flat base 424 connected to a sidewall of the first frame 42 for supporting the display panel 40. The root portion of the elastic piece 422 is fixed on the flat base 424. The display panel 41 is supported by the flat base 424 and the side of the display panel 41 is opposite to the inner side of the elastic piece 422. For assembly, the top of the elastic piece 422 is pulled outward first, and returned after putting the display panel 41 into the first frame 42, so as to prevent the abrasion of the display panel 41. The returned elastic piece 422 does not need to contact the display panel 41, so the first frame can require lower precision in size to simply the fabricating process. The elastic piece 422 includes a protrusion 4221 located at inner side of its top portion to face to the display panel 41, and another protrusion 4222 located at outer side of the elastic piece 422.

Figure 2C:
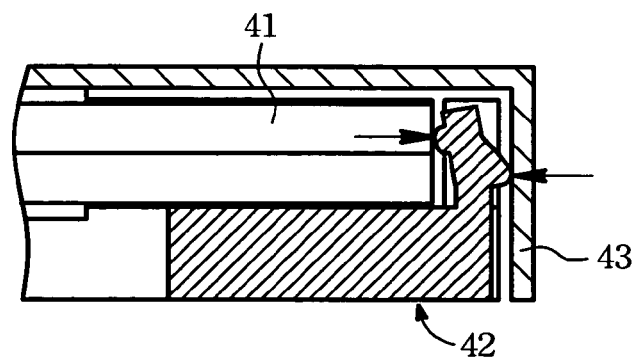
FIG. 2C is a sectional view of the sidewalls of the first and second frames.

Referring to FIG. 2C, the inner wall of the second frame 43 presses the protrusion 4222 to curve the elastic piece 422 to contact and clamp the side of the display panel 41. Thus, the gaps disappear between the display panel 41 and the first frame 42, or between the first frame 42 and the second frame 43. The protrusion 4221 can make sure that the display panel 41 is abutted tightly against the elastic piece 422 undergoing pressure. There is no limitation in shape or material of the protrusion 4221. The preferable shape or material can increase the contacting area and frictional force between the protrusion 4221 and the display panel 41. The protrusion 4222 with preferable shape and structure is uneasy to fall away from the second frame 43 after assembling.

Figure 2D:
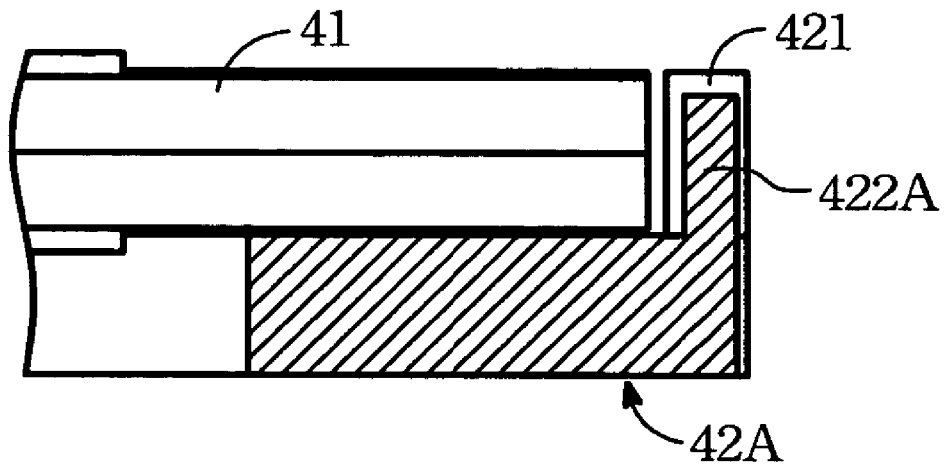
FIG. 2D is a sectional view of a simplified elastic piece applied to the combination of the display panel and the first frame.
Figure 2E:
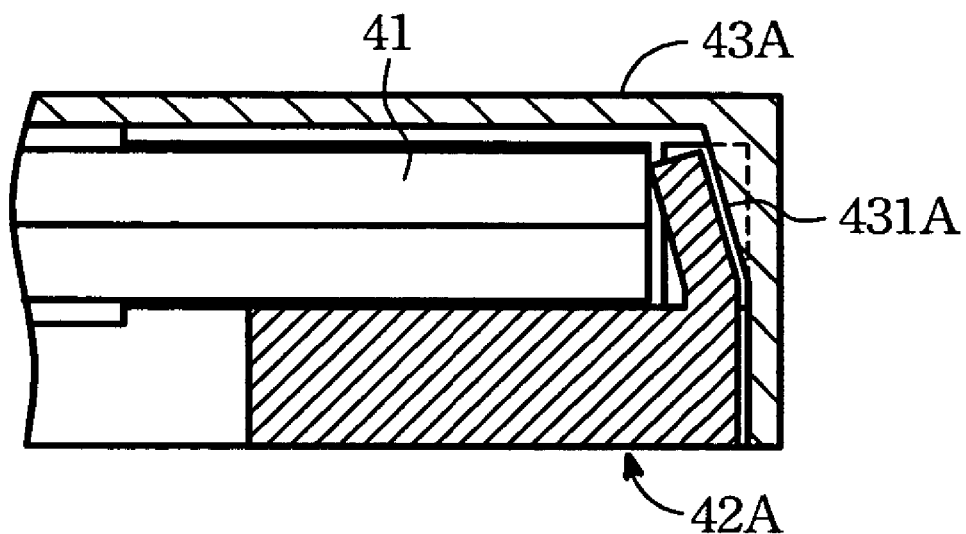
FIG. 2E is a sectional view of the result structure of combining the second frame having a declined plane with the first frame having simplified elastic piece.

It is optional to use the protrusions 4221 and 4222 in the present invention. FIG. 2D-2E shows a simplified elastic piece 422A without protrusions. As shown in FIG. 2D, when the display panel 41 is put into the first frame 42, it does not contact with the elastic piece 422A or the sidewall 421. As shown in FIG. 2E, the second frame 43 has a declined inner wall 431A, which guides the elastic piece 422A to curve, so as to abut against the display panel 41. In this embodiment, the elastic piece 422A has smaller contacting area with the display panel 41, so a high frictional material is applied to the inner side of the elastic piece 422A to enhance the frictional force.

Figure 3A:
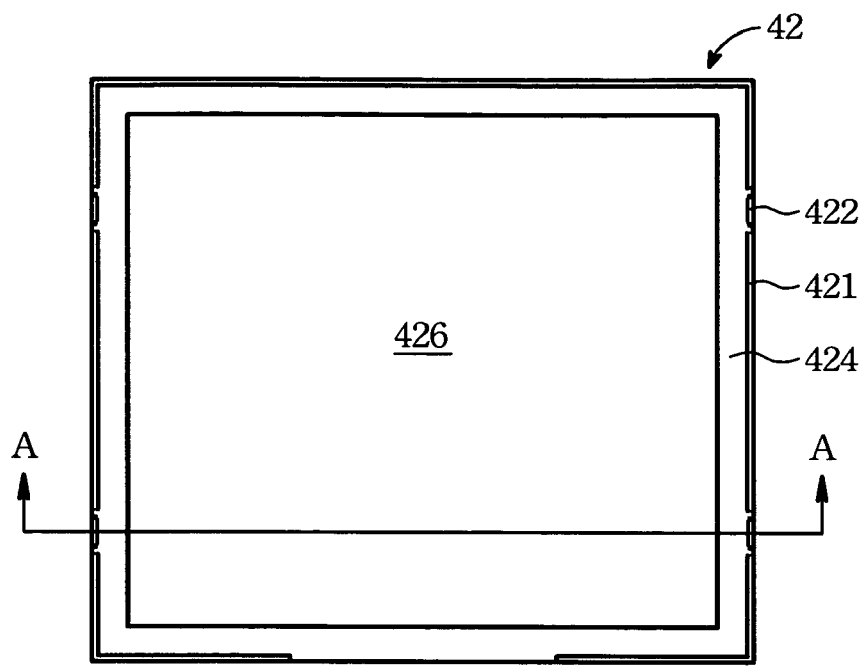
FIG. 3A is a top view of the first frame.

FIG. 3A shows a top view of the first frame 42. The first frame 42 has a window 426 that is formed in its center region, and a sidewall 421, an elastic piece 422 and a flat base 424, which are located at the edge. The sidewall 421 and the elastic piece 422 cooperate with the flat base 424 to enclose the peripheral portion of the display panel 41. The A-A section of the first frame of FIG. 3A is shown as FIG. 2A.

Figure 3B:
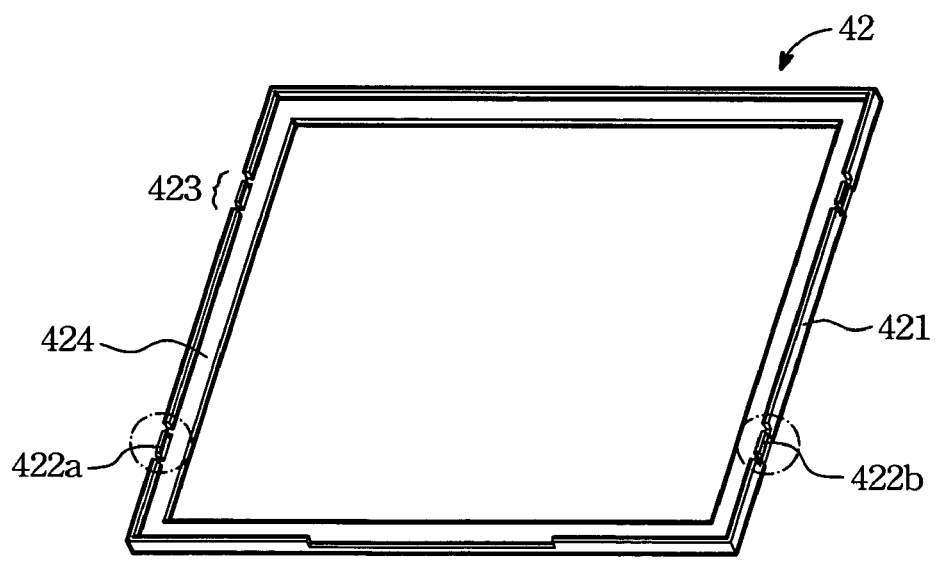
FIG. 3B is a stereo diagram of the first frame.

FIG. 3B shows the sidewall 421 has a breach 423, and the left elastic piece 422a or the right elastic piece 422b is disposed in the breach 423.

Figure 3C:
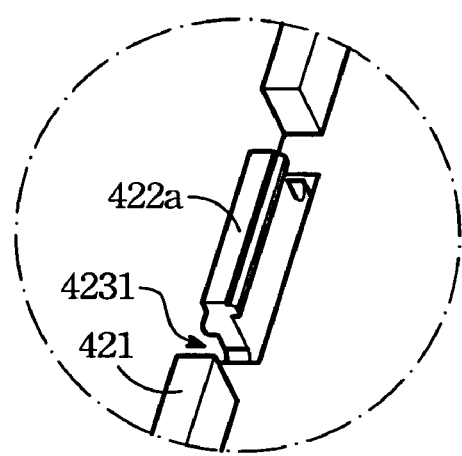
FIGS. 3C-3D are enlarged views of the elastic piece and its peripheral portion.
Figure 3D:
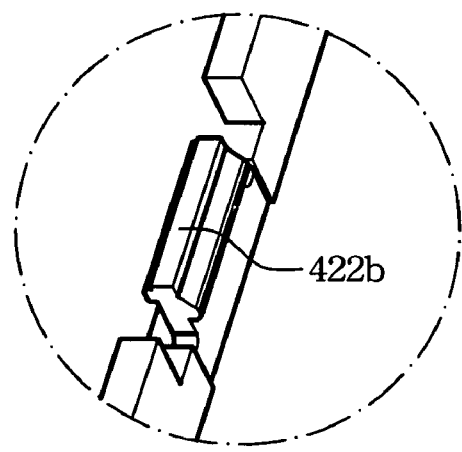

Referring to FIGS. 3C-3D, the root portions of the left elastic piece 422a and the right elastic piece 422b are fixed to a plane in the bottom of the breach 423. Preferably, the elastic pieces 422a and 422b close the breach 423 incompletely, so a gap 4231 is formed between the elastic pieces 422a, 422b and the sidewall 421.

Figure 3E:
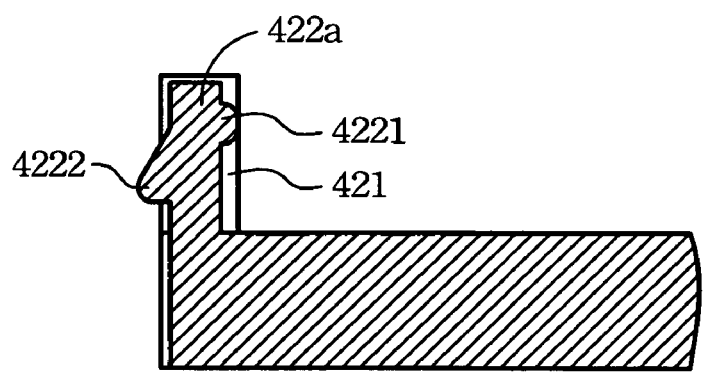
FIG. 3E is a sectional view of the elastic piece.

FIG. 3E is a section view of the left elastic piece 422a. The relative position between the protrusions 4221 and 4222 is not limited. For example, the protrusion 4221 is located over the protrusion 4222 in FIG. 3E. The protrusion 4222 is roughly shaped as a wedge. The declined plane of the wedge is convenient to guide the second frame 43 to sleeve on the first frame 42.

Figure 4:
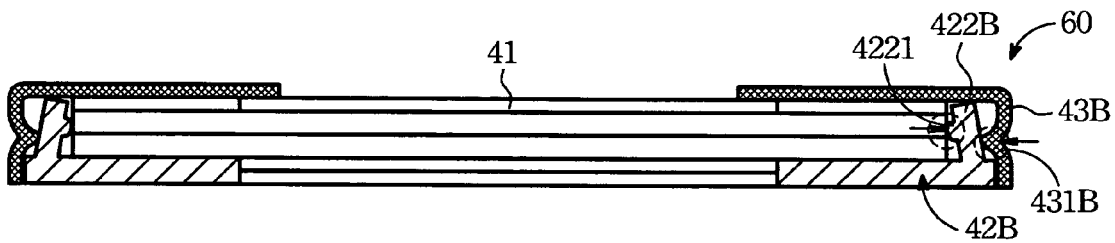
FIG. 4 is another flat panel display module according to the present invention.

FIG. 4 is another flat panel display module according to the present invention. The first frame 42B and the second frame 43B of the flat panel display module 60 are different from that of forgoing embodiments. The elastic piece 422B of the first frame 42B has only the protrusion 4221 which faces to the display panel 41, but do not have the protrusion 4222 which faces to the second frame 43B. A protrusion 431B is disposed at the inner wall of the second frame 43B and is formed integrally with the second frame 43B. When combining the second frame 43B with the first frame 42B, the protrusion 431B presses the outside of the elastic piece 422B to curve until the protrusion 4221 abuts against the side of the display panel 41.

The display panel 41 can be a liquid crystal panel or an organic electroluminescent display panel etc. The following embodiment illustrates a liquid crystal panel is applied to a liquid crystal module.

Figure 5:
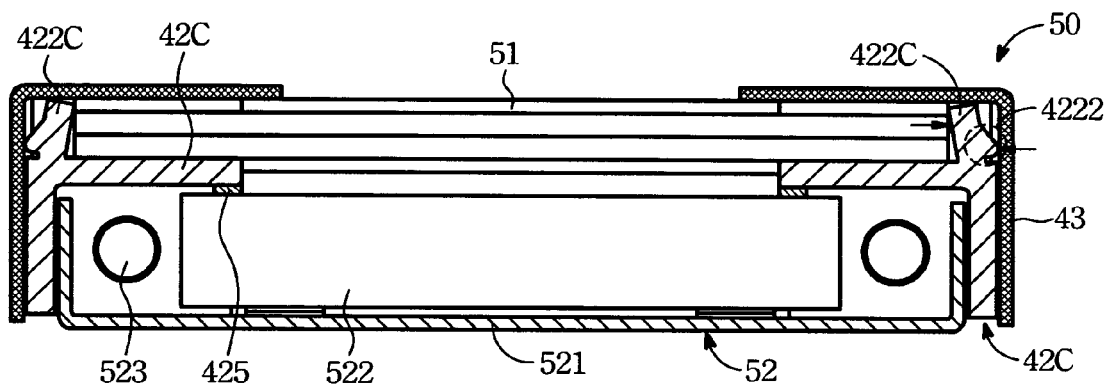
FIG. 5 is a liquid crystal module according to the present invention.

FIG. 5 is a liquid crystal module according to the present invention. The liquid crystal module 50 includes a liquid crystal panel 51, the first frame 42C, the second frame 43 and a backlight module 52. The elastic piece 422C of the first frame 42C has only the protrusion 4222 facing outside. When the second frame 43 assembled on the first frame 42C, the inner wall of the second frame 43 presses the protrusion 4222 to make the inside of the elastic piece 422C abut against the side of the liquid crystal panel 51. The backlight module 52 is located below the window of the first frame 42C, and includes a receptacle body 521, a light guide plate 522 disposed in the receptacle body 521, and at least one light source 523 disposed at the side of the light guide plate 522. For assembling with the backlight module 52, the sidewall of the first frame 42C can extend downward to sleeve on the receptacle body 521. A foot block 425 is disposed below the inner portion of the flat base 424 (not numbered) to fix the light guide plate 522 or optical films (not shown).

Figure 6:
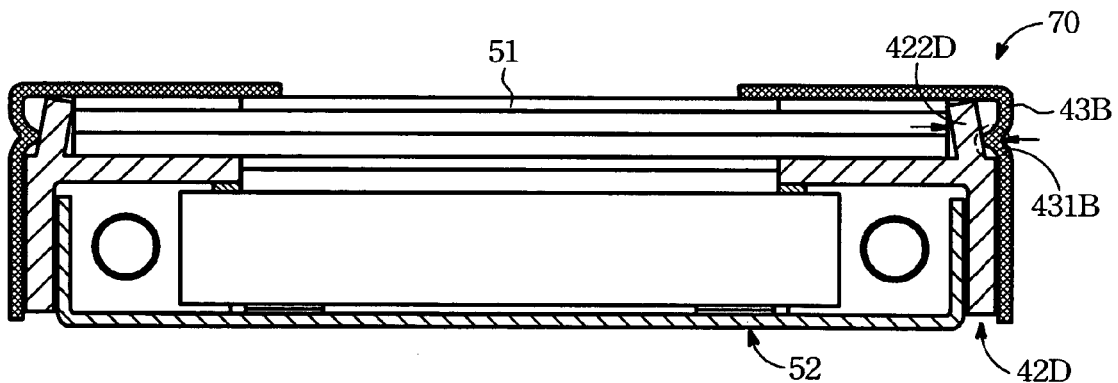
FIG. 6 is another liquid crystal module according to the present invention.

FIG. 6 is another liquid crystal module according to the present invention. The liquid crystal panel 51 is disposed on the first frame 42D, and then assembled by the second frame 43B shown in FIG. 4. The elastic piece 422D has no protrusions, so it is pressed only by the protrusion 431B of the second frame 43B to abut against the liquid crystal panel 51. The result structure can combine with the backlight module to construct the liquid crystal module 70.

As above-mentioned, the first frame 42, 42A, 42B, 42C or 42D can be a plastic frame. The second frame 43, 43A or 43B can be a metal frame. The elastic piece 422, 422A, 422B, 422C or 422D can be made from plastic or rubber, and formed integrally with the first frame 42, 42A, 42B, 42C or 42D. The sidewall of the first frame and the elastic piece can be formed as a piece. A plurality of elastic pieces are disposed at the peripheral portion of the plastic frame. When the metal frame is assembled with the plastic frame, the oblique elastic pieces can absorb the gaps between the display panel and the plastic frame, and between the plastic frame and the metal frame, so as to prevent the display panel from shaking. In addition, the features, for example, reserving a gap 4231 between the elastic piece 422 and the sidewall of the first frame 42 etc., may be applied to the liquid crystal modules 50 and 70.

In comparison with the prior art, the flat panel display modules and the frames thereof according to the present invention have the following characteristics. The design of elastic pieces is more convenient for the display panel to assemble, enhances structure strength of the flat panel display modules, and is capable of protecting the display panel from wearing.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A flat panel display module, comprising:
   a display panel;
   a first frame having a sidewall and an elastic piece, wherein the sidewall encloses the display panel and has a breach formed on the sidewall, and the elastic piece is disposed in the breach; and
   a second frame assembled on the first frame to press the elastic piece, whereby the elastic piece is curved to contact a side of the display panel.

2. The flat panel display module of claim 1, wherein the elastic piece has a first protrusion abutted against the side of the display panel.

3. The flat panel display module of claim 2, wherein the elastic piece has a second protrusion projecting to the outside of the first frame.

4. The flat panel display module of claim 3, wherein the second frame presses the second protrusion so that the elastic piece is curved to contact the side of the display panel.

5. The flat panel display module of claim 2, wherein the second frame has a second protrusion at an inner wall thereof, and the elastic piece is curved to make the first protrusion contact the side of the display panel through the second protrusion of the second frame.

6. The flat panel display module of claim 1, wherein the first frame further has a flat base connected with the sidewall of the first frame for supporting the display panel.

7. The flat panel display module of claim 1, wherein one end of the elastic piece is fixed to a plane in the bottom of the breach.

8. The flat panel display module of claim 1, wherein the elastic piece is spaced from the sidewall of the first frame.

9. The flat panel display module of claim 1, wherein the first frame is made of plastic.

10. The flat panel display module of claim 1, wherein the sidewall of the first frame is formed integrally with the elastic piece.

11. The flat panel display module of claim 1, wherein the display panel includes a liquid crystal display panel.

12. A flat panel display module, comprising;
    a display panel;
    a first frame having a sidewall and an elastic piece, wherein the sidewall having a breach formed on the sidewall encloses the display panel, and the elastic piece, having a protrusion projecting to the outside of the first frame, is disposed in the breach; and
    a second frame, assembled on the first frame to press the protrusion, whereby the elastic piece is curved to contact a side of the display panel.

13. The flat panel display module of claim 12, wherein the elastic piece is spaced from the sidewall of the first frame.

14. The flat panel display module of claim 12, wherein the sidewall of the first frame and the elastic piece are formed as a piece.

15. The flat panel display module of claim 12, wherein the first frame further has a flat base connected with the sidewall of the first frame for supporting the display panel.

16. The flat panel display module of claim 12, wherein one end of the elastic piece is fixed to a plane in the bottom of the breach.

17. A flat panel display module, comprising;
    a display panel;
    a first frame having a sidewall and an elastic piece, wherein the sidewall having a breach formed on the sidewall encloses the display panel, and the elastic piece is disposed in the breach; and
    a second frame, assembled on the first frame and having an protrusion at an inner wall of the second frame to press the elastic piece, whereby the elastic piece is curved to contact a side of the display panel.

18. The flat panel display module of claim 17, wherein the elastic piece is spaced from the sidewall of the first frame.

19. The flat panel display module of claim 17, wherein the second frame is integrally formed.

20. The flat panel display module of claim 17, wherein the first frame further has a flat base connected with the sidewall of the first frame for supporting the display panel.

* * * * *